2,598,360

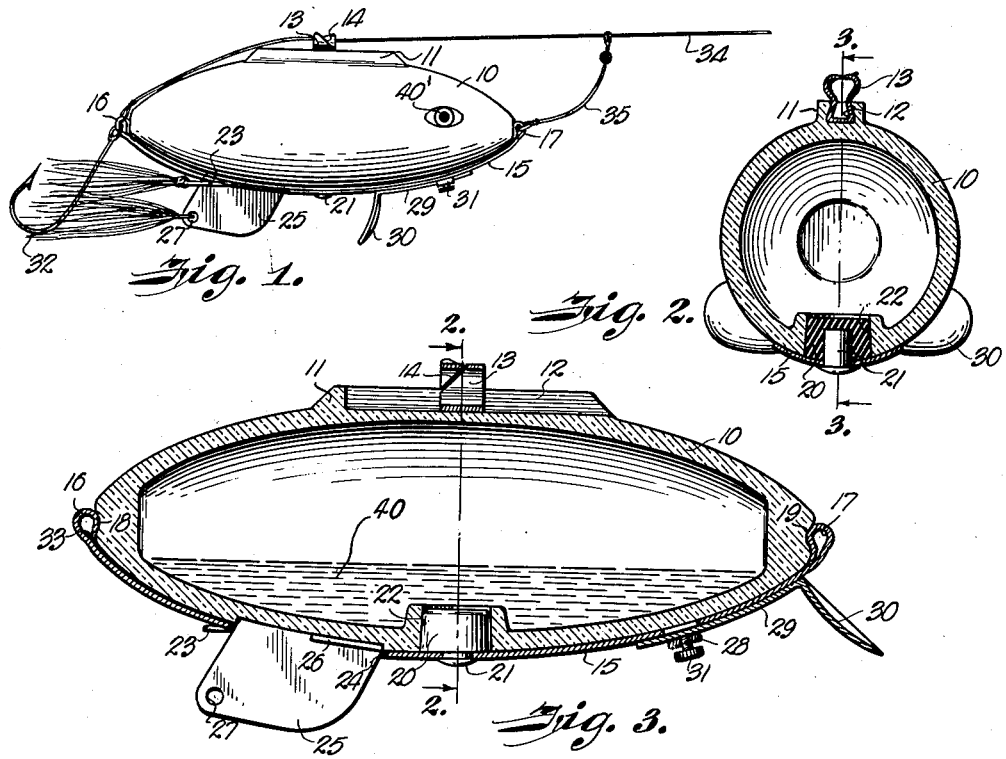
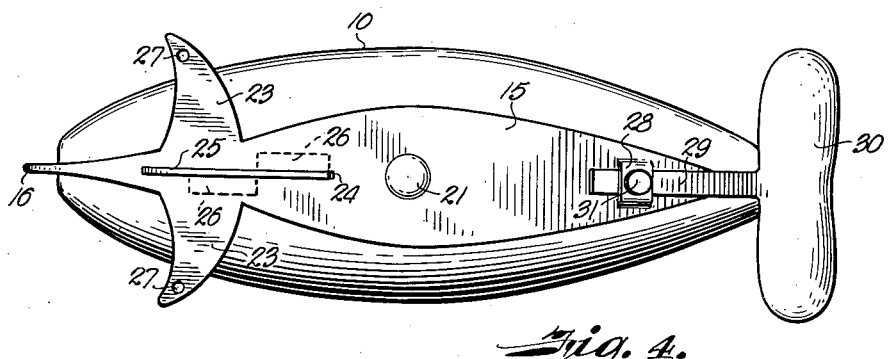
Inventor
George A. Cummins
By Thos. F. Acofield
Attorney Patented May 27, 1952

UNITED STATES PATENT OFFICE 2,598,360

FISH LURE

George A. Cummins, Tulsa, Okla.

Application October 7, 1946, Serial No. 701,647

17 Claims. (Cl. 43—42.08)

The present invention relates in general to lures of the kind employed as artificial bait in fishing, and it deals more particularly with the type of lure commonly designated as a plug.

Such plugs are well-known to sportsmen, being made in many colors and shapes and being provided with a wide variety of attachments designed to enhance their attractiveness to fish or otherwise improve their effectiveness. It is customary for a fisherman to provide himself with a number of different kinds of plugs and on each particular occasion to try them one after another until one having some inexplicable appeal to the prey is discovered. Naturally by such trial and error the sportsman gradually learns something of the conditions and type of fishing for which each plug is best suited, but even after gaining this experience he still must have a wide variety of plugs at hand to meet varying situations and he must remain ready to experiment with these if the occasion demands.

It is an object of the present invention to provide a single improved plug-type lure which will serve the purpose of a large number of different fish plugs of the conventional kind.

More specifically, it is an object of the invention to provide a lure the color of which may be changed at will.

Another object is to provide a lure which may be employed either as a top-water bait or as an under-water bait.

Still another object is to provide a lure to which a number of interchangeable "attracter" or "action" fittings may be readily attached.

Another object is to provide an arrangement whereby attachment of a fish hook and/or fish line to the lure is made easier than heretofore.

A further object is to provide a lure which when drawn through the water has an improved action or movement, together with means for readily varying this movement.

A feature of the invention resides in the provision of a lure frame to which various attachments including the hook or hooks and the fish line are secured, together with one or more interchangeable hollow bodies adapted to be snapped into the frame. The lure body may be allowed to remain empty or, alternatively, water or other material may be introduced therein through a suitable filler hole for ballast purposes. In either case the body is sealed when the frame is in place. If a number of such bodies are provided, the different ones of these may be of different color; as an alternative, a single body of transparent material may be employed and the ballast material introduced therein colored as desired to impart a color to the body of the lure.

According to another feature of the invention the fish line is arranged to be connected to the lure at the trailing rather than the leading end of the plug so that the plug, in effect, is pushed rather than pulled through the water. The line is threaded through a guide which is positioned intermediate the ends of the plug whereby the plug tends to wobble or oscillate about this guide; the position of the guide is adjustable on the plug body to vary or control such movement.

Other objects and features will appear in the course of the following description of the invention.

In the accompanying drawings which form a part of the specification and are to be read in conjunction therewith, and in which like reference numerals are employed to indicate the various parts of the views:

Fig. 1 is an elevational view showing the side of a lure constructed according to the invention, Fig. 2 is an enlarged sectional view of the lure taken along the lines 2—2 of Fig. 3 in the direction of the arrows, Fig. 3 is an enlarged sectional view taken along the line 3—3 of Fig. 2 in the direction of the arrows, Fig. 4 is an enlarged elevational view showing the bottom of the lure, and Fig. 5 is a perspective view of a removable attachment for the lure.

Referring more particularly to the drawings, my lure has a hollow body 10 which is generally ovaloid in shape. It preferably is molded of a synthetic resin (although other materials obviously may be used) and it may either be made in one piece or formed in sections which thereafter are cemented or otherwise bonded together.

On the upper side of the body 10 is an integral raised portion 11 containing a longitudinal slot or groove 12. A guide 13 is slidably supported in the groove, this guide being made of a strip of flat sheet metal cut diagonally at the ends and bent as shown so that the ends are spaced apart slightly, leaving a diagonal slot 14 in the top of the guide. It is inserted in the groove 12 from the front or right-hand end; the other end of the groove being closed.

Fitting snugly against the under side of the body 10 is a bowed main frame 15 formed of spring metal stock. This frame tapers from a rather wide center section towards its two ends, and each end is looped back upon itself to provide an eyelet as shown at 16 and 17. Due to the concavo-convex shape of the center portion of the frame this is quite rigid, but the ends are springy and are tensioned toward one another so that they fit into suitable depressions or dimples 18 and 19 provided at the ends of the lure. This serves to clip the frame securely to the body of the lure yet permits it to be detached therefrom easily when desired.

A plug-like closure member 20 rigidly attached to the frame 15 in any suitable way, for instance by cementing or otherwise bonding it to a stud 21 extending through the frame, is adapted to seal an aperture 22 which is provided in the under side of the body 10. This closure member may be made of rubber or, if desired, of the same material as the body of the lure.

Rearwardly of the closure member the frame 15 is provided with two laterally extending horizontal fins 23. Between them there is a narrow longitudinal slot 24 in the frame. A vertical or anal fin 25 is positioned in this slot and is maintained erect by two oppositely disposed lugs or flanges 26 at the upper margin of the fin, these being positioned in a shallow recess in the body 10 and retained in place by the frame 15. The various fins have apertures 27 to permit colored yarn, bucktail or other decoration to be tied thereto.

At a point forward of the closure plug 20 a bridge or strap 28 is struck out of the metal of the frame 15 whereby the shank 29 of a slightly curved transverse plate 30 may be inserted thereunder, either from the front as shown in Figs. 3 and 4 or from the back as shown in Fig. 1. The shank is rather long in order to permit forward and backward adjustment of the plate's position, the plate being held in any selected position by a set screw 31 arranged in a tapped hole in the strap 28. This set screw preferably has a knurled head to facilitate manual adjustment thereof.

The lure is prepared for use by removing the frame 15 from the body 10 and first attaching a fishhook 32 (which may either have a single prong, as shown, or multiple prongs) to the frame's rear eyelet 16. This may conveniently be done by forcing the looped end of the hook through the space 33. Next, a loop is tied in the end of the fish line 34 and this is inserted in the frame's rear eyelet 16 in the same way. A short auxiliary guide line 35 one end of which is tied to, or looped over the main line 34 then has its other end attached to the frame's forward eyelet 17 in a similar fashion. The body 10 of the lure now is re-inserted in the frame so that plug 20 is in aperture 22 and the eyelets at opposite ends of the frame are seated in the dimples 18 and 19, after which line 34 is inserted through the diagonal slot 14 into the guide 13. It is contemplated that bodies of different color and/or different surface markings may be attached interchangeably to the frame in this manner; and it will be seen that one body may easily be removed from the frame and another inserted in its place without disconnecting the lines 34 and 35 or the hook 32 from the frame.

In use, the lure is drawn through the water by line 34 which exerts its pull at the rear of the device rather than at the front in conventional fashion. Because the line 34 is threaded through guide 13 this guide serves as a pivot about which the lure tends to oscillate or wobble, the extent of such movement being limited by the auxiliary line 35. The guide 13 may be moved forward or backward in groove 12 to vary the action of the lure.

As constructed the device may be used advantageously either for deep water fishing or for surface fishing. If a deep water bait is desired it may be had simply by filling the body 10 partly with water 40 before frame 15 is clipped in place thereon. This may be done conveniently by submerging the body 10 for a brief interval with the open aperture 22 held upwardly. When the frame thereafter is clipped in place the closure plug 20 seals the aperture, and under the influence of the ballast 40 now contained therein the lure will submerge to a depth suitable for deep water fishing. The amount of water ballast employed obviously may be varied to secure the performance desired; if all ballast is omitted, or only a small amount is used, the lure will be very buoyant and function as a top water bait.

The performance of the lure also may be varied in other ways. Under certain circumstances, for instance, it may be desirable to omit the vertical or anal fin 25, and this end may be achieved simply by removing frame 15 from the body of the lure, pushing the fin 25 out of the slot 24 and replacing the frame on the body. The plate 30 also may be omitted if desired; if used, it will give the lure a tendency to "nose down" (i. e., dive) or "nose up" as it advances depending upon whether it is mounted as shown in Figs. 3 and 4 or, alternatively, as shown in Fig. 1.

Other fittings may be attached to the frame 15 in the same fashion as plate 30. One of these, shown in Fig. 5, comprises a mounting bracket 37 having an offset bearing pin 38 on which the spinner 39 is rotatably mounted. The bracket is adapted to be inserted under strap 28 on the frame and secured thereto by the set screw 31. Similarly, other "action" or "attracter" attachments (such, for instance, as the so-called "plunker" or "popper" type of fitting, popular for surface fishing) may be removably mounted on the lure.

As mentioned hereinbefore bodies of different color and/or different surface markings may be used interchangeably on the same frame. A preferred alternative, however, is to construct the body of the lure of a transparent plastic and employ appropriately colored water 40 therein for ballast purposes. It has been determined that when this is done (even though a relatively small amount of colored water is present in the body) the color will be imparted to the entire lure due to the optical properties inherent in the shape of the structure and the materials involved. Thus, by equipping himself with small amounts of water soluble dyes of various colors, a fisherman may easily and conveniently have a lure colored to his liking, which color may be changed at will simply by changing the color of the water within the body of the lure.

If the body 10 is made of transparent material as suggested above, any desired surface markings such as eyes 40', simulated scales or the like may nevertheless be imprinted thereon. It also is preferred to make the closure member 20 of the same transparent material so that it will take on the color of the water within the lure.

From the foregoing it will be seen that this invention is one well adapted to attain all of the ends and objects hereinbefore set forth together with other advantages which are obvious and which are inherent to the device.

It will be understood that certain features and subcombinations are of utility and may be employed without reference to other features and subcombinations. This is contemplated by and is within the scope of the claims.

Inasmuch as many possible embodiments of the invention may be made without departing from the scope thereof it is to be understood that all matter herein set forth or shown in the accompanying drawings is to be interpreted as illustrative and not in a limiting sense.

Having thus described my invention, I claim:

1. In a fish lure, an elongated body dimpled at its two ends, and a removable frame adapted to be positioned longitudinally of the body and in contact therewith throughout substantially its entire length, said frame having spring clip extensions adapted to seat in the dimples when the frame is thus positioned thereby to releasably secure the frame on the body, said frame having thereon a device to which a fish line is connectable.

2. In a fish lure, an elongated body dimpled at its two ends, and a removable frame adapted to be positioned longitudinally of the body and in contact therewith throughout substantially its entire length, said frame having spring extension arms terminating in eyelets adapted to seat in the dimples when the frame is thus positioned thereby to releasably secure the frame on the body and provide eyelets at the ends of the lure body for connection of a hook and line thereto.

3. In a fish lure, an elongated body, a guide loop, means supporting said guide loop on said body, said means comprising a groove in said body in which said guide loop is adapted to slide longitudinally of said body, and a fish line threaded through the guide loop and secured to the rear end of the body so that the pull of said line on the body is applied at the trailing end of the body.

4. In a fish lure, a hollow generally ovaloid body apertured intermediate its ends to permit ballast to be introduced therein, a frame having spring clip means adapted to coact with the body to removably secure said frame to the body, a closure device carried by the frame for sealing the aperture in the body when the frame is in place thereon, and an eyelet on the frame for connecting a fish line thereto.

5. A lure as in claim 4 wherein said hollow body is transparent and wherein a colored liquid is contained in said body as ballast.

6. In a fish lure, a hollow ovaloid body dimpled at both ends and having an aperture intermediate said ends to permit ballast to be introduced therein, a bowed band adapted to be positioned longitudinally of said body covering the aperture, said band having its opposite ends tensioned toward one another and arranged to seat in said dimples thereby to hold the band in place, and closure means carried by the band for sealing the aperture in said body when the band is in place, said band having thereon a device to which a fish line is connectable.

7. In a fish lure, a hollow ovaloid body dimpled at both ends and having an aperture intermediate said ends to permit ballast to be introduced therein, a bowed band adapted to be positioned longitudinally of said body covering the aperture, said band having its opposite ends tensioned toward one another and arranged to seat in said dimples thereby to hold the band in place, and closure means carried by the band for sealing the aperture in said body when the band is in place, and at least one end of said band being doubled back on itself to form an eyelet.

8. In a fish lure, a hollow ovaloid body dimpled at both ends and having an aperture intermediate the ends to permit ballast to be introduced therein, a bowed band adapted to be positioned longitudinally of said body covering the aperture, said band having its opposite ends tensioned toward one another and arranged to seat in said dimples thereby to hold the band in place, closure means carried by the band for sealing the aperture in said body when the band is in place, a fin member, said band having a slot for receiving the fin member, and a flange on said member between the band and the body to hold the fin member in said slot.

9. In a fish lure, a hollow ovaloid body dimpled at both ends and having an aperture intermediate said ends to permit ballast to be introduced therein, a bowed band adapted to be positioned longitudinally of said body covering the aperture, said band having its opposite ends tensioned toward one another and arranged to seat in said dimples thereby to hold the band in place, closure means carried by the band for sealing the aperture in said body when the band is in place, a rigid strap on the band arched away from the body to form an eyelet, an attachment having an elongated shank insertable in said eyelet so that the attachment is either forward or aft of said eyelet as desired, and means on the strap to clamp the shank in inserted position.

10. In a fish lure, a generally ovaloid body dimpled at both ends, a bowed spring band adapted to be positioned longitudinally of the body and in contact therewith throughout substantially its entire length, said band having its opposite ends tensioned toward one another and arranged to seat in said dimples thereby to hold the band in place, said band having an elongated slot intermediate its ends, a fin having a flange clamped between the band and said body, said fin extending from said flange through said slot and projecting outwardly beyond said band.

11. A fish lure as in claim 10, wherein said elongated slot is disposed longitudinally of said spring band, and said band has on either side of said slot an integral outwardly projecting wing portion disposed in a plane substantially normal to said fin.

12. In a fish lure, a generally ovaloid body dimpled at both ends, a bowed spring band adapted to be positioned longitudinally of the body, said band having its opposite ends tensioned toward one another and arranged to seat in said dimples thereby to hold the band in place, interengaging elements on the body and on the medial portion of said band respectively for preventing said medial portion from shifting relative to the body in a circumferential direction, said band having at one end thereof an eyelet, said body having intermediate its ends a guide loop mounted on the side of the body diametrically opposite the medial portion of said band, and a fish line threaded through said loop and secured at its end to said eyelet.

13. In a fish lure, an elongated body dimpled at its two ends, a removable frame adapted to be positioned longitudinally of the body and in contact therewith substantially its entire length, said frame having spring clip extension arms adapted to seat in the dimples when the frame is thus positioned thereby to releasably secure the frame to the body, at least one of said arms being doubled back upon itself at its end to form an eyelet seating in one of said dimples.

14. In a fish lure, an elongated body dimpled at its two ends, a removable frame adapted to be positioned longitudinally of the body and in contact therewith throughout substantially its entire length, said frame having spring clip extension arms adapted to seat in the dimples when the frame is thus positioned thereby to releasably secure the frame to the body, at least one of said arms having its free end turned inwardly toward the body and then back along said arm to form a substantially closed eyelet seating in one of said dimples, said free end being flexible to open said eyelet when said frame is detached from said body thus to permit said free end to be threaded through the eye of a fish hook.

15. In a fish lure, an elongated body dimpled at its two ends, a removable frame adapted to be positioned longitudinally of the body and in contact therewith throughout substantially its entire length, said frame having spring clip extensions adapted to seat in the dimples when said frame is thus positioned thereby to releasably secure the frame of the body, a fin member, said frame having a slot for receiving the fin member, and a flange on the fin member between the frame and the body to hold said fin member in said slot when the frame is on the body.

16. In a fish lure, an elongated body dimpled at its two ends, a frame adapted to be positioned longitudinally of the body and in contact therewith throughout substantially its entire length, said frame having spring clip extensions adapted to seat in the dimples when the frame is thus positioned thereby to releasably secure the frame on the body, a rudder-like device adjustably mounted on said frame for controlling the lure's movement through the water, and means for releasably securing said device in any adjusted position.

17. In a fish lure, an elongated body dimpled at its two ends, a removable frame adapted to be positioned longitudinally of the body along one side thereof and in contact with the body throughout substantially its entire length, said frame having spring clip extensions adapted to seat in said dimples when the frame is thus positioned thereby to releasably secure the frame on the body, one of said spring clip extensions comprising an eyelet disposed at the end of said body, said body having intermediate its ends a guide loop mounted on the side of said body diametrically opposite said one side, and a fish line threaded through said guide loop and secured at its end to said eyelet.

GEORGE A. CUMMINS.

REFERENCES CITED

The following references are of record in the file of this patent:

UNITED STATES PATENTS

| Number | Name | Date |
|---|---|---|
| 643,573 | Votaw | Feb. 13, 1900 |
| 720,136 | Halliran | Feb. 10, 1903 |
| 765,482 | Hardy | July 19, 1904 |
| 1,002,981 | Ford | Sept. 12, 1911 |
| 1,003,962 | Henning | Sept. 19, 1911 |
| 1,200,135 | Reynolds | Oct. 3, 1916 |
| 1,415,653 | Koepke | May 9, 1922 |
| 1,423,025 | Rodgers | July 18, 1922 |
| 1,473,048 | Roberts | Nov. 6, 1923 |
| 1,477,864 | Bolton | Dec. 18, 1923 |
| 1,570,052 | Erwin | Jan. 19, 1926 |
| 1,792,989 | La Gue | Feb. 17, 1931 |
| 1,807,283 | Dick | May 26, 1931 |
| 1,981,091 | Clark | Nov. 20, 1934 |
| 2,025,988 | Klaff | Dec. 31, 1935 |
| 2,165,071 | Saarela | July 4, 1939 |
| 2,181,254 | Wilson | Nov. 28, 1939 |
| 2,204,552 | Singleton | June 18, 1940 |
| 2,217,565 | Seigle | Oct. 8, 1940 |
| 2,290,433 | Jeffers | July 21, 1942 |
| 2,309,521 | Mabee | Jan. 26, 1943 |
| 2,325,712 | Shurmur | Aug. 3, 1943 |
| 2,437,549 | Pecher | Mar. 9, 1948 |
| 2,517,157 | Adams | Aug. 1, 1950 |

FOREIGN PATENTS

| Number | Country | Date |
|---|---|---|
| 6,021 | Great Britain | of 1892 |
| 21,411 | Great Britain | of 1909 |
| 128,073 | Great Britain | of 1919 |